US008602357B2

United States Patent
Sayilgan (10) Patent No.: US 8,602,357 B2
(45) Date of Patent: Dec. 10, 2013

(54) INSTALLATION SYSTEM FOR THE CONNECTION OF SYSTEMS TO A STRUCTURE OF AN AIRCRAFT, A MEASUREMENT SYSTEM AND A METHOD

(75) Inventor: Cihangir Sayilgan, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 619 days.

(21) Appl. No.: 12/820,503

(22) Filed: Jun. 22, 2010

(65) Prior Publication Data

US 2010/0320327 A1 Dec. 23, 2010

Related U.S. Application Data

(60) Provisional application No. 61/219,003, filed on Jun. 22, 2009, provisional application No. 61/267,053, filed on Dec. 6, 2009.

(30) Foreign Application Priority Data

Jun. 22, 2009 (DE) .......................... 10 2009 029 754
Dec. 6, 2009 (DE) .......................... 10 2009 056 593

(51) Int. Cl.
*B64C 1/06* (2006.01)

(52) U.S. Cl.
USPC ...................... 244/131; 244/129.1; 244/118.5

(58) Field of Classification Search
USPC ....................... 244/131, 129.1, 118.5; 248/70
See application file for complete search history.

(56) References Cited

U.S. PATENT DOCUMENTS

| | | | | |
|---|---|---|---|---|
| 1,840,216 | A * | 1/1932 | Tormo | 248/72 |
| 3,320,712 | A * | 5/1967 | Rapata | 52/511 |
| 4,896,851 | A * | 1/1990 | Shaull | 248/72 |
| 7,059,565 | B2 * | 6/2006 | Scown et al. | 244/117 R |
| 8,100,360 | B2 * | 1/2012 | Gross et al. | 244/119 |
| 8,262,023 | B2 * | 9/2012 | Kofinger et al. | 244/119 |
| 2005/0082431 | A1 * | 4/2005 | Scown et al. | 244/119 |
| 2009/0026318 | A1 * | 1/2009 | Gross et al. | 244/131 |
| 2009/0159750 | A1 * | 6/2009 | Sayilgan et al. | 244/131 |
| 2010/0127128 | A1 * | 5/2010 | Giavarini | 244/131 |
| 2010/0252684 | A1 * | 10/2010 | Stephan | 244/131 |
| 2011/0233336 | A1 * | 9/2011 | Dervault et al. | 244/119 |
| 2012/0037756 | A1 * | 2/2012 | Guthke et al. | 244/131 |

FOREIGN PATENT DOCUMENTS

DE 102007032233 A1 1/2009

* cited by examiner

*Primary Examiner* — Christopher P Ellis
(74) *Attorney, Agent, or Firm* — Leydig, Voit & Mayer, Ltd.

(57) ABSTRACT

An installation system includes a structure for an aircraft, at least one carrier for an arrangement of at least one device of the aircraft, at least two attachment elements configured to attach the at least one carrier to the structure, and at least one mounting having an adjustable reception element receiving one of the at least two attachment elements.

12 Claims, 9 Drawing Sheets

INSTALLATION SYSTEM FOR THE CONNECTION OF SYSTEMS TO A STRUCTURE OF AN AIRCRAFT, A MEASUREMENT SYSTEM AND A METHOD

CROSS REFERENCE TO PRIOR APPLICATIONS

Priority is claimed to German Patent Application No. DE 10 2009 029 754.5, filed Jun. 22, 2009, U.S. Provisional Application No. 61/219,003, filed Jun. 22, 2009, German Application No. DE 10 2009 056 593.0, filed Dec. 6, 2009 and U.S. Provisional Application No. 61/267,053, filed Dec. 6, 2009. The entire disclosure of all applications is incorporated by reference herein.

FIELD

The invention relates to an installation system for the connection of systems to a structure of an aircraft, in particular of lines or cabin components to a primary structure of an aircraft, and a method for the connection of systems.

The invention furthermore relates to a measurement system for the automated control of the connection of such systems to a primary structure of an aircraft.

BACKGROUND

In aircraft construction, systems such as lines are conventionally connected to sections of a primary structure of the aircraft by means of a large number of mounts. The mounts are attached to the sections by means of rivets inserted into holes in the primary structure, and have a receiver for the lines. The large number of holes implies, however, a weakening of the primary structure. Furthermore the connection procedure is time-intensive and arduous for the installation personnel, in particular in the case of overhead tasks.

The trend is therefore in the direction of attaching the system mounts to carrier rails that are connected to the primary structure. A concept of this kind is described in the U.S. Pat. No. 7,059,565 B2. The carrier rail, or carrier, runs in the direction transverse to the lines and at each end is arranged on two adjacent frames or stringers by means of a plug that snaps into a corresponding hole in the primary structure. For the reception of the mounts the carrier rail has a pattern of holes. The German patent application DE 10 2007 032 233 A1 of the applicant moreover recommends arranging a plurality of carrier rails in the form of a lattice and connecting mutually crossing carrier rails with one another. By means of these solutions, the weakening of the primary structure material is certainly reduced as a result of the still-small number of holes, and also the attachment of the mounts is simplified by virtue of the pattern of holes in the carrier rails, but the carrier rails, or the lattice of carrier rails, have a tendency towards geometrical deviations as a result of their relatively large extension, which makes the introduction, or snapping, of their attachment plugs into the holes in the structure difficult.

SUMMARY OF THE INVENTION

An aspect of the present invention is to provide an installation system for the connection of systems to a structure of an aircraft, in particular of lines or cabin components to a primary structure of an aircraft, which eliminates the aforesaid disadvantages and allows compensation for tolerances, and also a method for the connection of systems. Furthermore, an aspect of the invention is to provide a measurement system with a positioning device for the introduction, alignment and connection of installations systems of this type.

An installation system in accordance with the invention for the connection of systems to a structure of an aircraft, in particular of lines or cabin components to a primary structure of an aircraft, has at least one carrier for the arrangement of the systems and two attachment elements for the attachment of the at least one carrier to the structure. In accordance with the invention a mounting is provided on the structure with an adjustable reception element for the section-by-section reception of the attachment element.

The adjustment or alignment of the reception element on the structure to at least one attachment element on the carrier has the advantage that geometrical deviations of the carrier during mounting on the structure can be compensated for, and thus a compensation for tolerances between the mountings on the structure and the attachment elements of the system takes place. Consequently the carrier is not deformed during connection to the structure. Accordingly mounting can take place simply and rapidly. The solution according to the invention moreover has the advantage that when using a plurality of adjustable reception elements, the installation system per se can be aligned with the structure. To this end the reception element is aligned during connection of the attachment element with the respective reception element and then, when all the reception elements are aligned, the installation system can be aligned by displacements of the reception elements in the aircraft.

In one exemplary embodiment adjustment of the reception element takes place automatically, so that no time-intensive pre-adjustment needs to be undertaken. The reception element aligns itself automatically with the attachment element.

The reception element preferably allows an alignment, or a compensation for tolerances, in a plane transverse to the direction of insertion of the attachment element. By this means tolerances can be compensated for in a plurality of directions.

The reception element can in particular be supported in a floating manner in a cage attached to the structure. This has the advantage that during alignment it is not guided in fixed guide tracks but can move freely in the plane.

The alignment of the reception element with the attachment element can be simplified if the attachment element has a plug with a half-shell-shaped head, respectively a shell-shaped head.

For the anchorage of the plug on or in the reception element an anchorage device can be provided. This has the advantage that the attachment element is connected securely with the reception element and, for example, production aids such as struts or lifting trolleys for the support of the installation system can be removed during mounting.

The anchorage device preferably has a pre-tensioned slider for engagement into an anchoring groove of the plug, which covers an area of a receiver receiving one of the plugs. By this means anchorage takes place automatically when the attachment element is introduced into the receiver.

To fix the reception element after alignment a locking element can be provided. This allows constraint of the installation system in an aligned position and prevents displacements of the installation system after mounting.

In one exemplary embodiment the locking element is a nut that can be screwed onto the external thread of the plug. This solution requires only a few parts and enables a simple, rapid and reliable fixing or locking action.

A securing element is preferably provided to secure the locking element. By this means the position of the installation system is doubly secured against displacements or alterations in location, which complies with aviation directives that are in force.

In one exemplary embodiment the securing element is a split pin that can be inserted into a transverse hole in the plug. This is quick to set in position and its functionality can be checked at any time.

Preferably at least one attachment element can be displaced in the longitudinal direction of the carrier, so that the distance between the attachment elements on the carrier can be flexibly adapted to the structure in question. Consequently the connection of the installation system in accordance with the invention can take place, for example, on stringers, frames, cross-beams, or similar.

In one exemplary embodiment the carrier is provided on at least one end section with a latching mechanism for the insertion of the attachment element. This enables a "snap-and-click" connection, so that an adaptation of the distances between attachment elements can take place without an additional tool.

Furthermore, an embodiment of the invention is achieved by a measurement system whereby the at least one module can be inserted by means of the positioning device into the fuselage section and can be aligned and fixed therein by means of the measurement system and the positioning device at least in a partially automated manner.

By this means, in addition to the actual transfer of the module or modules into the fuselage section, an at least partially automated (pre-) alignment of the module within the provided mounting location in the fuselage section and a subsequent precision alignment is possible.

In an advantageous further development of the measurement system, this comprises at least one non-contact position scanner, in particular a laser position scanner, in order to determine the position of at least one mounting on the structure in relation to at least one attachment element on the module taking into account a predetermined tolerance zone.

The alignment of the module transferred into the fuselage section by means of the positioning device preferably takes place under the continuous monitoring of the measurement system, wherein at the same time it is checked whether the mountings on the structure lie within a predetermined tolerance zone of the measurement system. If the check reveals that at least one mounting lies outside the predetermined tolerance zone of, for example, ±2.5 mm in the aircraft longitudinal direction x and/or the aircraft transverse direction y, an error message is output by the measurement system. Before the automated continuation of the alignment process, in this case the manual shifting or realignment of the at least one mounting on the structure, in particular the cross-beams, of the fuselage section is required. To facilitate the work, the error message can contain, for example, the absolute or relative spatial coordinates to which the mounting in question should be shifted.

The insertion of the module into the fuselage section can either take place manually or automatically respectively taking into account or monitoring the spatial coordinate of the current position of the module delivered by the measurement system.

In an embodiment, a method for the connection of systems to a structure of an aircraft, in particular of lines or cabin components to a primary structure of an aircraft, with at least two carriers for the arrangement of the systems, includes arrangement of the systems on at least two carriers to form at least one module and attachment of the carriers to the structure, whereby for the connection of systems, in particular of lines or cabin components, to a structure of an aircraft, the systems are assembled together into at least one module, and are attached to at least two carriers. The carriers, fitted with the systems, are then attached to the structure.

This solution has the advantage that arduous non-ergonomic overhead tasks for the installation personnel are eliminated and consequently ergonomically adapted movements are rendered possible. The carriers can easily be fitted with the systems and connected onto the structure at prepared mounting points in the fuselage section.

In one exemplary embodiment at least one installation system in accordance with the invention is used to connect the systems. To this end at least one reception element is arranged on the structure for the reception of an attachment element on the carrier. The attachment element is then introduced into a receiver of the reception element and anchored in the receiver by means of an anchorage device. Subsequently the installation system is aligned and the reception element is fixed. The installation system can in principle be transferred to the installation site inside the fuselage system manually and/or at least partially automatically by means of the measurement system in accordance with the invention and the positioning device, aligned there and finally fixed on the structure.

In a further development of the method, the following steps are additionally carried out:

a) receiving the module in a positioning device,
b) aligning the at least two attachment elements on the module in relation to a hole in the reception element of the mounting in at least one spatial direction, in particular parallel to the aircraft longitudinal direction x and/to the aircraft transverse direction y by moving the positioning device,
c) checking by means of at least one position scanner of the measurement system arranged on the positioning device whether the plugs of the attachment elements on the module can be brought into engagement with the respective holes of the reception element of the mountings taking into account a tolerance zone outside the hole, and
d) continuing with process step b) of introduction of the attachment element section-by-section in a receiver of the reception element if this is the case.

By this means the automatic transfer of the module to be installed in the fuselage section and the independent alignment of the module in the xy plane therein is achieved. The xy plane is spanned or defined by the aircraft longitudinal direction x and the aircraft transverse direction y. The tolerance zone forming the basis of the alignment of the module by means of the laser scanner preferably has a square shape with an edge length of 5 mm (tolerance compensation by means of the floating reception elements maximum ±2.5 mm in the x direction and the y direction) and an imaginary point of the square coincides in each case with the central points of the holes in the reception elements of the mountings. During the measurement process the laser scanners in each case record the (imaginary) central points of the holes in the reception elements of the mountings.

In a further development of the method it is provided that in the event of a negative test result, step b) of aligning the at least two attachment elements on the module in relation to a hole in the reception element of the mountings in at least one spatial direction is repeated until the check in the subsequent step c) reveals that the plugs of the attachment elements on the module can be brought into engagement with the respective holes in the reception element of the mountings taking into account the tolerance zone outside the hole or at least one of the holes in the mountings lies outside the tolerance zone and the alignment of the module is interrupted whilst issuing an error message.

By this means an incorrect position of the mounting on the structure can be identified and the method can be interrupted whilst issuing an error message. Following a preferably manually accomplished relocation of those mountings which lie outside the tolerance zone, the module can be realigned and in the event that a stress- and distortion-free intermeshing is possible as a result of the data delivered by the laser position scanners, said module can be raised by means of the positioning device preferably parallel to the direction of insertion z and snapped onto the mountings and hereby initially secured against falling down. The module thus secured in its position can, if necessary, be precision aligned manually and ultimately fixed on the structure of the cross-beams of the fuselage section by tightening the nuts and inserting the securing pins (split pins). The precision alignment is accomplished parallel to the aircraft longitudinal direction x or to the aircraft transverse direction y.

BRIEF DESCRIPTION OF THE DRAWINGS

Preferred exemplary embodiments of the invention are elucidated in more detail hereinafter with the aid of schematic representations. In the figures:

FIG. 14 shows an enlarged section from FIG. 13, FIGS. 15 to 20 show a schematic representation of process steps in an automated alignment and connection of the module in the structure by means of the positioning device

In the figures the same design elements have the same reference numbers.

DETAILED DESCRIPTION

Figure 1:
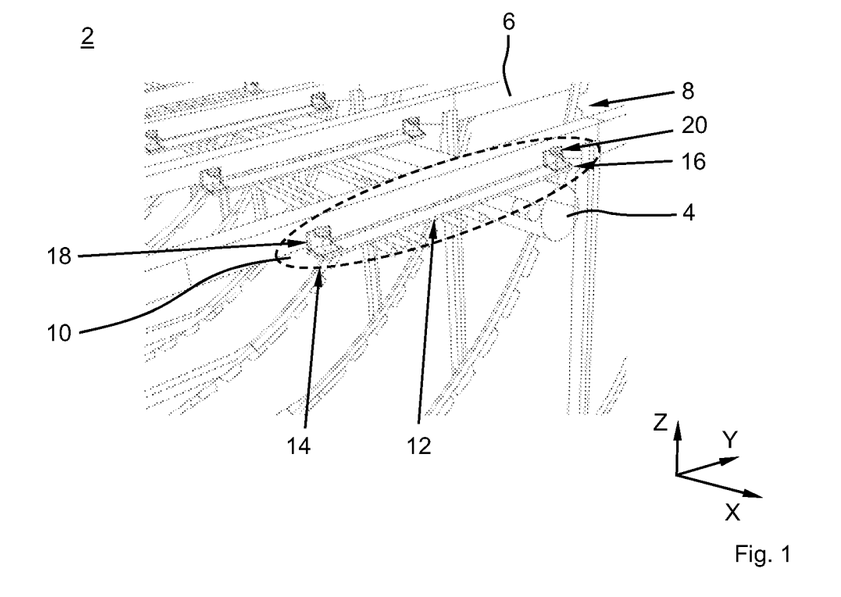
FIG. 1 shows an arrangement of a module fitted with lines, with installation systems in accordance with the invention in a fuselage section.

FIG. 1 shows a perspective representation of a module 2 for the connection of systems, in particular lines 4 and cabin components, to cross-beams 6 of a fuselage section 8 of an aircraft. The module 2 has a large number of installation systems 10 in accordance with the invention. In the interests of clarity only one line 4, one cross-beam 6, and one installation system 10 are provided with a reference number in each case.

The installation systems 10 have in each case a rail-type carrier 12 for the reception of the lines 4, two attachment elements 14, 16 on the carrier and two mountings 18, 20 on the structure. The carriers 12 run in the transverse direction of the aircraft y and are arranged on the mountings 18, 20 by means of the attachment elements 14, 16 arranged at each end. The lines 4 extend in the longitudinal direction of the aircraft x and comprise both cables and also air conditioning pipes, and other system circuits. They are attached to the carriers 12 by means of cable ties, or similar.

Figure 2:
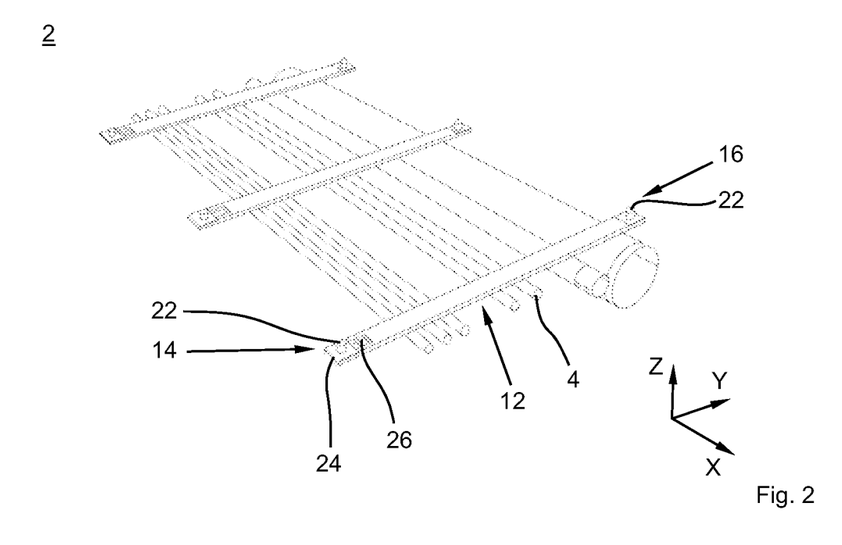
FIG. 2 shows an individual representation of the module from FIG. 1.

In accordance with FIG. 2 each of the attachment elements 14, 16 has a plug 22, which extends from a base plate 24, by means of which it is connected to the carrier 12. To set the distance between the two attachment elements 14, 16 in the longitudinal direction of the carrier the latter has a latching mechanism 26 for the reception of the base plate 24 in one of its end sections, into which the base plate 24 can engage or snap in a form fit.

The carriers 12 of the individual installation systems 10 are only connected with one another via the lines 4. Structural longitudinal stiffeners between the carriers 12 to form a carrier lattice or frame are not provided in the exemplary embodiment shown here.

Figure 3:
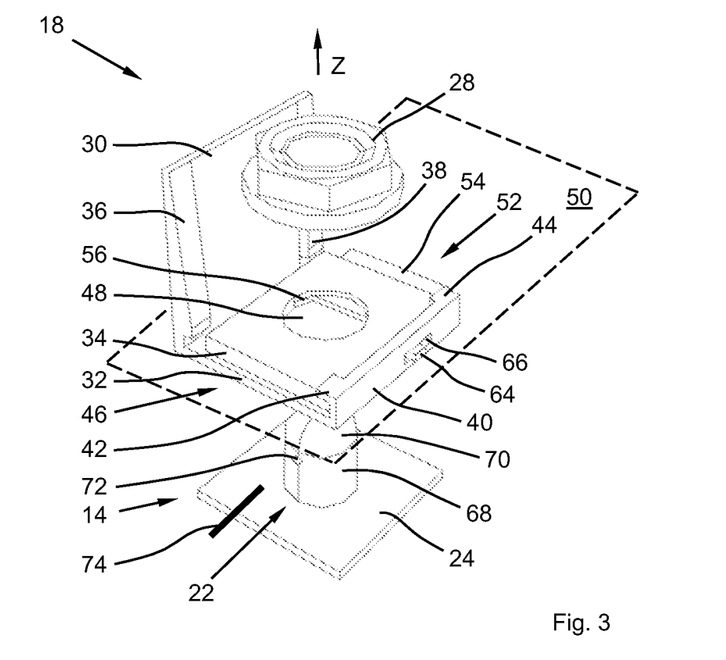
FIG. 3 shows a detailed representation of the installation system from FIG. 1.

FIG. 3 shows, in a representative manner for all mountings, or attachment elements in accordance with the invention, the mounting 18, the attachment element 14 and a locking element designed as a nut 28.

The mounting 18 has an L-shaped profile with a retention plate 30 for the connection to the cross-beam 6, and a guide plate 32 for the support of a reception element 34.

The retention plate 30 is attached by means of rivets, for example, to the cross-beam 6. Two ramps or wedge-shaped body sections, 36, 38 are formed on its edge sections located remotely from one another, these ramps rising in the direction of the guide plate 32 and being separated from the latter.

The guide plate 32 has on its free edge section a web 40 extending parallel to the retention plate 30, which web has two projections 42, 44 opposite the ramps 36, 38, pointing in the direction of the latter. The ramps 36, 38, the edge 40, together with the projections 42, 44, define a cage 46 for the guidance and support of the reception element 34.

The reception element 34 is designed in the form of a plate and has a hole 48 to receive the plug 22 of the attachment element 14. It is supported in a floating manner in the cage 46 and can thus be moved in a plane 50 transverse to the direction of insertion z, such that when the plug 22 is introduced it automatically adjusts its position relative to the latter. To anchor the plug 22 in the direction of insertion z in the reception element 34 an anchorage device 52 with a slider 54 is provided.

Figure 4:
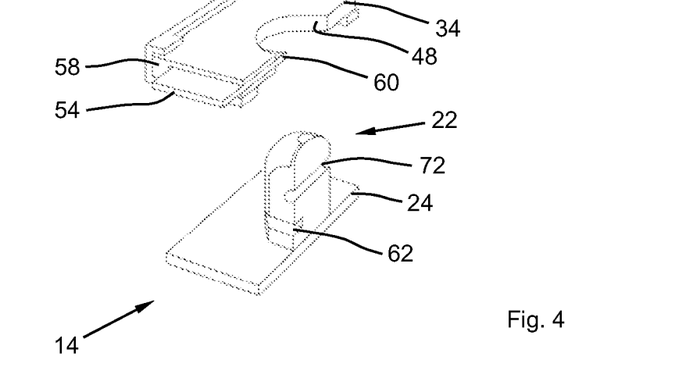
FIG. 4 shows a rearward sectional representation of components shown in FIG. 3.

The slider 54 is arranged in a guide 56 within the reception element 34, the guide being open towards a narrow side 58 of the reception element 34 shown in FIG. 4. The slider 54 is designed in the form of a plate and is pre-loaded by means of a spring in the direction of the hole 48. It covers an area of the hole 48 and when the plug 22 is introduced an edge section 60 of the slider snaps into an anchoring groove 62 of the attachment element 14. To secure the slider 54 in the guide 56 the former has a finger 64 that is received in an elongated hole 66 of the web 40 of the guide plate 32.

In accordance with FIG. 3 the attachment element 14 has a cylindrical shaft 68, which extends from the base plate 24 and a half-shell-shaped head 70, respectively a shell-shaped head, for the simplified automatic adjustment of the reception element 34. The shaft 68 is penetrated by a transverse hole 72 for the reception of a split pin 74 designed as a securing element, and is provided with an external thread, not shown, to enable the nut 28 to be screwed on. The anchoring groove 62 is formed between the base plate 24 and the transverse hole 72 on a side of the shaft 68 facing away from the observer. In accordance with FIG. 4 it extends parallel to the base plate 24 and has a U-shaped cross-section.

The nut 28 serves to fix the reception element 34 and thus the installation system 10 in its finally aligned position in the plane 50. It is screwed onto the shaft 68 of the plug 22 and secured against release by means of the split pin 74 inserted into the transverse hole 72.

Figure 5:
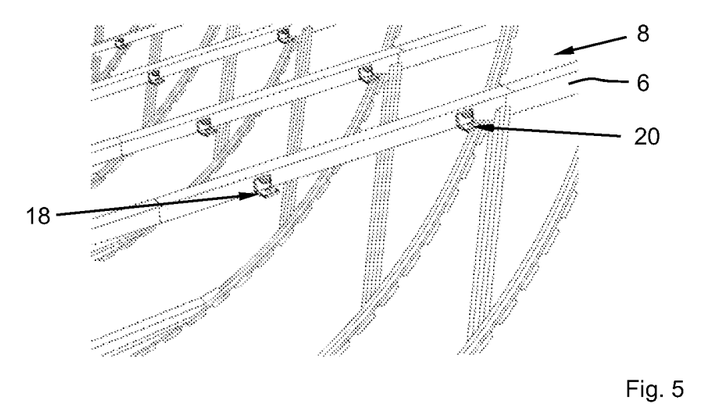
FIGS. 5 to 12 show steps in the method for the connection in accordance with the invention of the installation system to a structure.

A connection in accordance with the invention of the module 2 shown in FIG. 2 to the structure 6 is elucidated hereinafter: the lines 4 are assembled together into the module 2 shown in FIG. 2 and attached to the carriers 12 outside the fuselage section 8. As shown in FIG. 5, the mountings 18, 20 are attached to sections of the cross-beam 6 provided.

Figure 6:
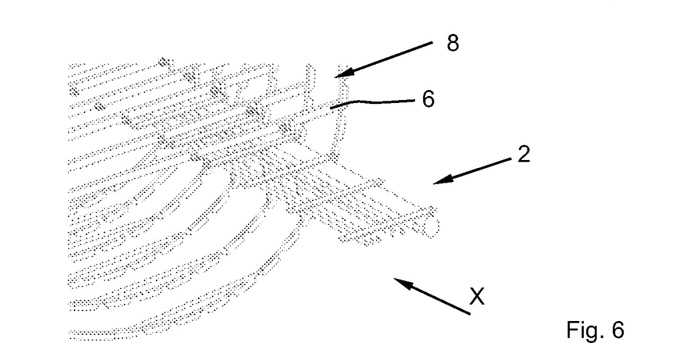
Figure 7:
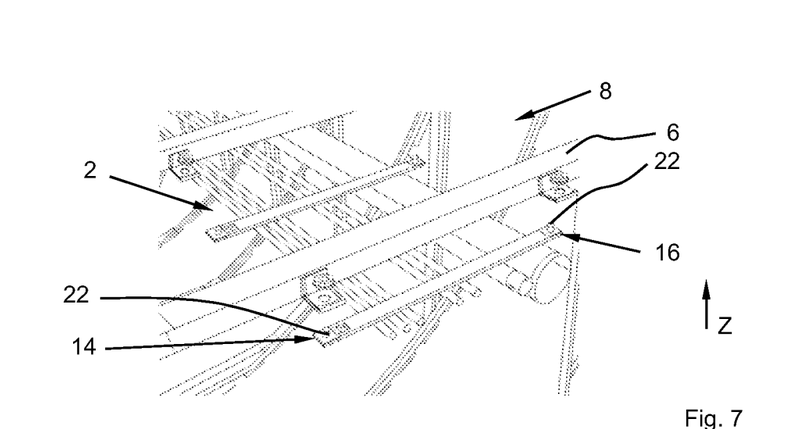
Figure 8:
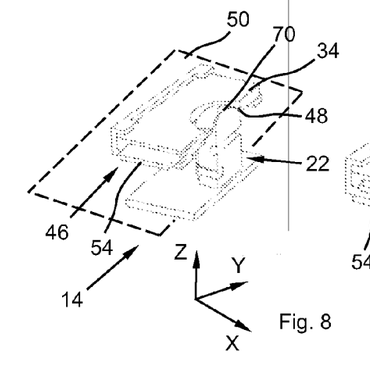
Figure 9:
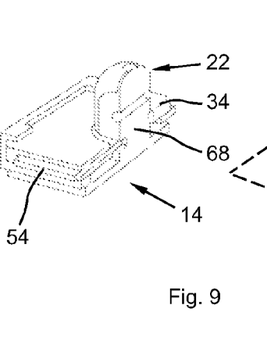
Figure 10:
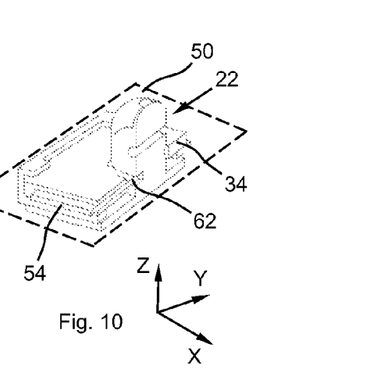
Figure 11:
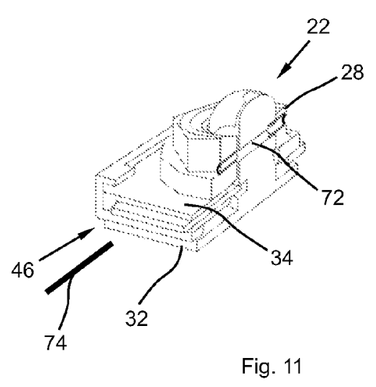
Figure 12:
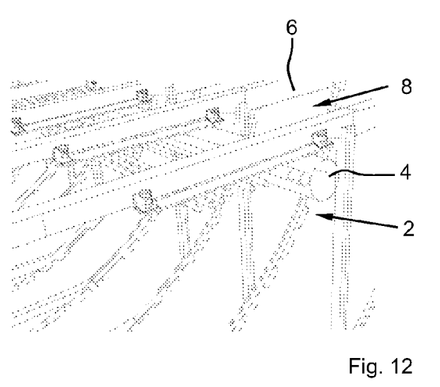

In accordance with FIG. 6, the module 2 is moved into the fuselage section 8 in the aircraft longitudinal direction x. The module 2, as shown in FIG. 7, is then raised in the z-direction and the plugs 22 of the attachment elements 14, 16 are introduced into the holes 48 of the reception elements 34 in accordance with FIG. 8. The half-shell-shaped heads 70 of the plugs 22 run onto the inner peripheries of the holes 48 and the reception elements 34, by virtue of the floating support in their cages 46, self-adjust automatically in the plane 50, i.e. in the aircraft longitudinal direction x and the aircraft transverse direction y, at right-angles to the direction of insertion z. The sliders 54 slide out across the heads 70 of the plugs 22 and are pushed back against their pre-loads. The plugs are introduced further and in accordance with FIG. 9 the sliders 54 slide across the shafts 68 until, as shown in FIG. 10, they latch into the anchoring grooves 62 by virtue of their pre-load. In this manner the module 2 is suspended or anchored, in the direction of insertion z. The individual reception elements 34 are now aligned in accordance with the attachment elements 14, 16 or are adjusted to the mountings 18, 20, without thereby being locked in the plane 50. By virtue of the suspension in the z-direction, production aids supporting the module 2, such as lifting trolleys, can now be removed. After anchorage in the direction of insertion z, the module 2 is manually aligned in the fuselage section 8 in the plane 50 and is thus brought into its final position. After the alignment of the module 2 in the fuselage section 8 the nuts 28 are screwed onto the plugs 22 as shown in FIG. 11. By this means the reception elements 34 in their cages 46 are pressed against the guide plates 32 and are braced against the latter such that the degrees of freedom in the longitudinal x and transverse y directions of the aircraft are also locked. To secure the nuts 28 the split pins 74 are inserted into the transverse holes 72 of the plugs 22. In this manner the module 2, as shown in FIG. 12, is anchored or secured, to the cross-beams 6 or to the primary structure in all directions.

Due to the previous alignment of the reception elements 34 and the subsequent alignment of the module 2, the module 2 is located in the required position, without the module 2 being subject to deformations during mounting or being in the connected state. Geometrical deviations, or alterations in location, of the carriers 12 of a module 2 relative to one another, which have ensued by virtue of the attachment of the lines 4, are in accordance with the invention compensated for during mounting of the module 2.

Figure 13:
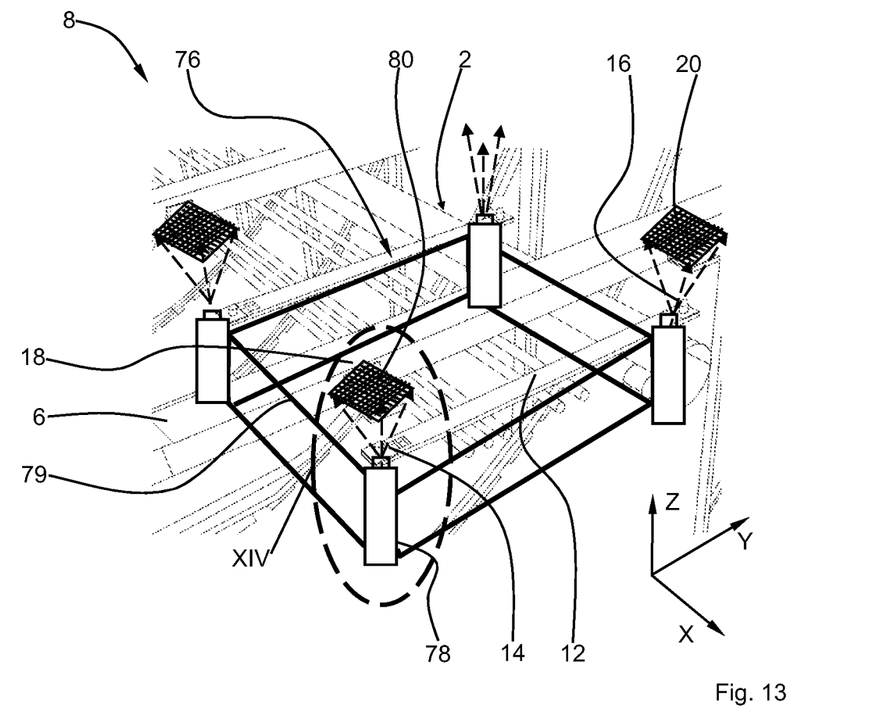
FIG. 13 shows a schematic representation of the module received on a positioning device.

FIG. 13 shows a schematic representation of a measurement system with a positioning device on which a module is received.

The positioning or transporting device 76 merely indicated in the figures can, for example, comprise a presenting frame in grid design which can be moved and aligned in a manner controlled by a control and/or regulating device, not shown, and by means of actuators, not shown, largely freely in space, i.e. in particular parallel to the aircraft longitudinal direction z, to the aircraft transverse direction y and/or the direction of insertion z. The direction of insertion z of the module 2 preferably coincides with the vertical axis of the aircraft but can have a different spatial orientation and, for example, run obliquely to the vertical axis in order to facilitate the connection of lines of the module 2 to lines on modules which are already fixed in position. The positioning device 76 furthermore has a large number of receivers, not shown, for the temporary mounting of the module 2, which, if necessary can be locked and released again controlled by the control and/or regulating device. The positioning device 76 can be configured to be rail-guided, whereby a sufficiently precise alignability of the module 2 parallel to the aircraft longitudinal axis x inside the fuselage section 8 and at the same time, simple transport of the module 2 in the fuselage section 8 is achieved. Alternatively the positioning device 76 can also be fitted with a wheeled or track-type chassis. In order to allow an alignment also in the aircraft transverse direction y and in the direction of insertion z in the case of a rail-guided configuration of the positioning device 76, for example, the receivers on the positioning device 76 are designed to be displaceable parallel to these orientations by means of actuators.

In accordance with the invention, the positioning device 76 has a non-contact position scanner in each of the non-designated corner regions of which only the front position scanner has the reference number 78 for the sake of better clarity of the drawing. The four position scanners shown in their entirety form the measurement system 79. The positioning device 76 in cooperation with the measurement system 79 constitutes an at least partially automatic mounting apparatus for the alignment and fixing of a module 2 in the fuselage section 8.

The two angular mountings 18, 20 are located on the front cross-beam 6. On the front carrier 12 the module 2 has two attachment elements 14, 16 for bringing into engagement with the mountings 18, 20. As indicated by the dashed lines and the grid area, the position scanner 78 spans an approximately square scanned tolerance zone 80.

Figure 14:
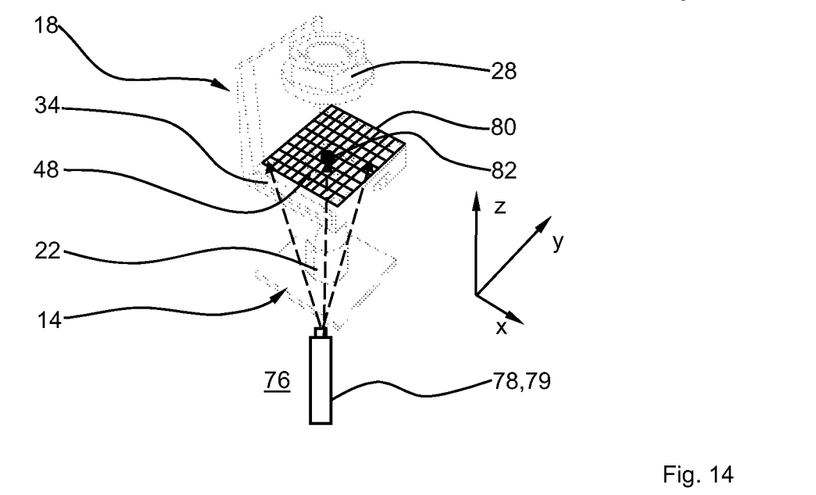

FIG. 14 shows an enlarged view of the section XIV from FIG. 13.

The plug 22 of the attachment element 14 can be brought into the hole 48 in the reception element 34 in the alignment shown and fixed therein by means of the nut 28, that is the attachment element 14 on the module and the mounting 18 on the structure are optimally aligned in relation to one another in the position shown (desired position). The tolerance zone 80 in this case corresponds to a maximum permissible deviation of a central point 82 of the hole 48 in the reception element 34 for which the plug 22 can still be inserted into the hole 48. In the exemplary embodiment shown in FIG. 14, the tolerance zone 80 has an extension of 5 mm×5 mm so that it is possible to compensate for a tolerance of ±2.5 mm in the aircraft longitudinal direction x and/or in the aircraft transverse direction y.

If the mounting 18 is located, for example, outside this tolerance zone 80 covered by the position scanner 78, it is absolutely essential to move this manually on the structure or on the cross-beam. In the aircraft transverse direction y this can be accomplished, for example, by inserting new holes and placing new rivets in the cross-beam 6 for attachment of the mounting in question. In the aircraft longitudinal direction x, for example, so-called shims can be placed under the mountings and the mountings can then be re-attached to the cross-beam together with the shims. At least the determination as to whether all the mountings are located within the tolerance zones is made by means of the measurement system 79 provided on the positioning device 76. The measurement system 79 can at the same time monitor the approach process of the attachment elements 14, 16 of the module 2 in the course of the pre-alignment in relation to the mountings 18, 20 on the structure, that is the positioning device 76 is provided with corresponding control signals for regulating and/or controlling the traversing process.

Alternatively, the alignment of the module 2 can also be accomplished by manual triggering of the actuators in the positioning device 76 whilst respectively taking into account the position data (i.e. the spatial coordinates) supplied by the measurement system 79.

FIGS. 15 to 20 to which reference is made simultaneously in the following illustrate in a highly schematic view the sequence of an at least partially automatic alignment process by means of the measurement system 79 and the positioning device 76 with the module 2 located thereon inside the structure.

Figure 15:
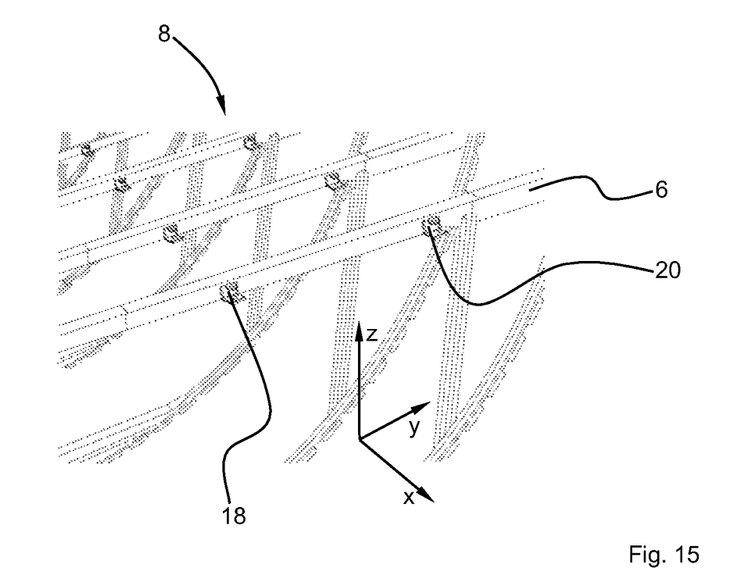

FIG. 15 shows the cross-beam 6 of the structure with the two mountings 18, 20 attached thereto at the front in the initial state.

Figure 16:
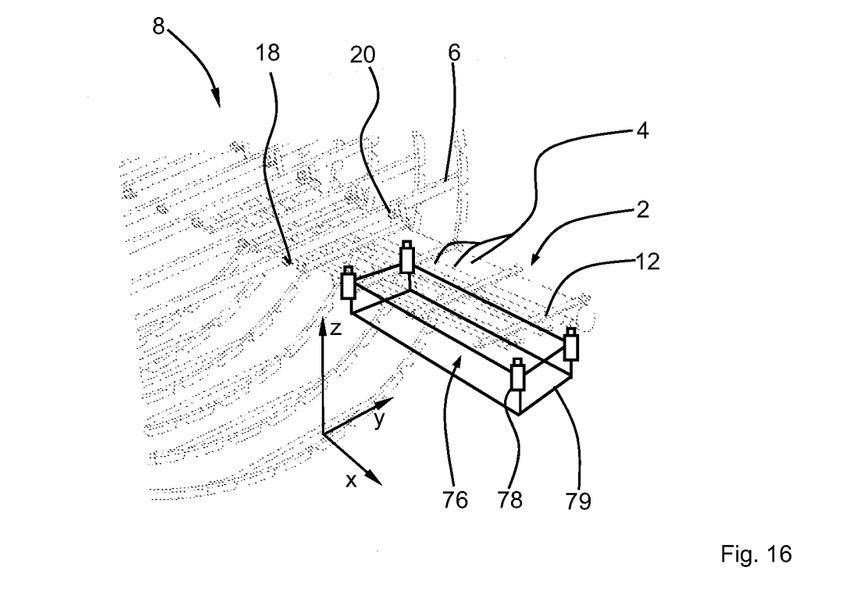

FIG. 16 illustrates how the module 2 received temporarily on the positioning device 76 is moved with a large number of lines 4 or routes attached on a carrier 12 into the fuselage section 8 substantially in an opposite direction parallel to the aircraft longitudinal direction x. In this case, a continuous determination of the position of the module 2 is made by means of the position scanner 78 as well the other three position scanners of the measurement system 79 not provided with reference numbers so that at any time position corrections of the module 2 in any spatial direction in relation to the fuselage section 8 can be made by means of actuators of the positioning device 76 which are not shown.

Figure 17:
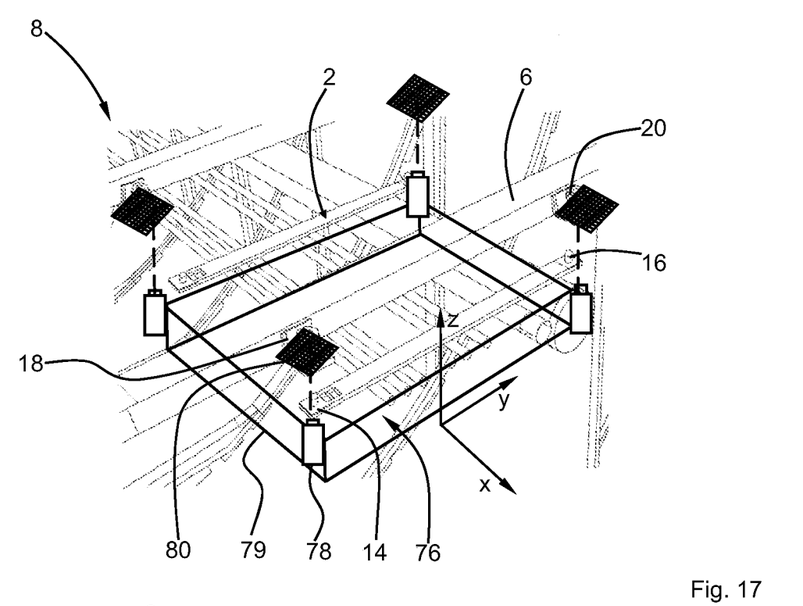

FIG. 17 illustrates how the module 2 in another process step is aligned along the aircraft longitudinal direction x and the aircraft transverse direction y by means of the positioning device 76 by preferably parallel traversing movements in relation to the mountings 18, 20 whilst continuously monitoring the position by means of the measurement system 79. This process is repeated until the attachment elements 14, 16 on the module can be brought into engagement with the corresponding mountings 18, 20 on the cross-beam 6 or, however, it can be determined by means of at least one of the four position scanners of the measurement system 79 that at least one of the mountings 18, 20 on the structure lies outside one of the tolerance zones which are scanned by the position scanners or predetermined.

If, for example, the front mounting 18 is located outside the tolerance zone 80, the process is initially interrupted and the mounting 18 must be moved manually on the cross-beam 6 until this or its non-designated hole in the floatingly mounted reception element lies in the tolerance zone 80 of the position scanner 78. Following this, the process sequence is continued by renewed alignment or positioning of the module 2 until the stress-free engagement of all the mountings 18, 20 on the structure and attachment elements 14, 16 is possible. If, on the other hand, all the mountings are located in the area of the provided tolerance zones, the process can proceed further, free from interruption, fully automatically.

Figure 18:
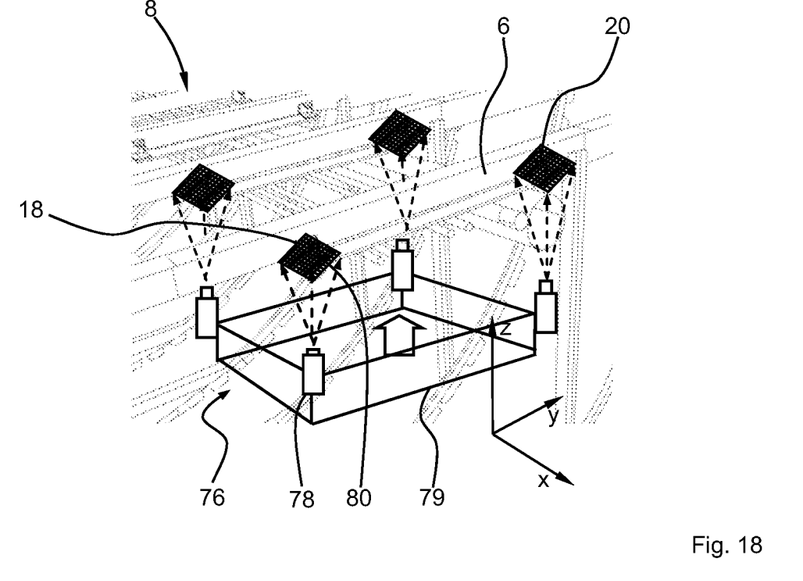

After reaching this correct (desired) position, in another process step the module 2 is raised perpendicularly in the direction of insertion z by means of the positioning device 76, as can be seen from FIG. 18 and for example, the front mountings 18, 20 are brought into engagement with the herewith-corresponding attachment elements on the module, not designated here. These traversing movements of the positioning device 76 can also be accomplished whilst monitoring or checking by the measurement system 79. In this case, the mountings 18, 20 are initially only preliminarily engaged with the attachment elements on the module (cf. description FIGS. 8 to 12, i.e. the module is initially only latched onto the mountings) so that the positioning device 76 can be removed from the fuselage section 8 again without the risk of the module 2 falling down, and the module 2 can be displaced both in the aircraft longitudinal direction x and also in the aircraft transverse direction y only by a small amount of up to a few millimeters in relation to the structure and hereby finely aligned.

Figure 19:
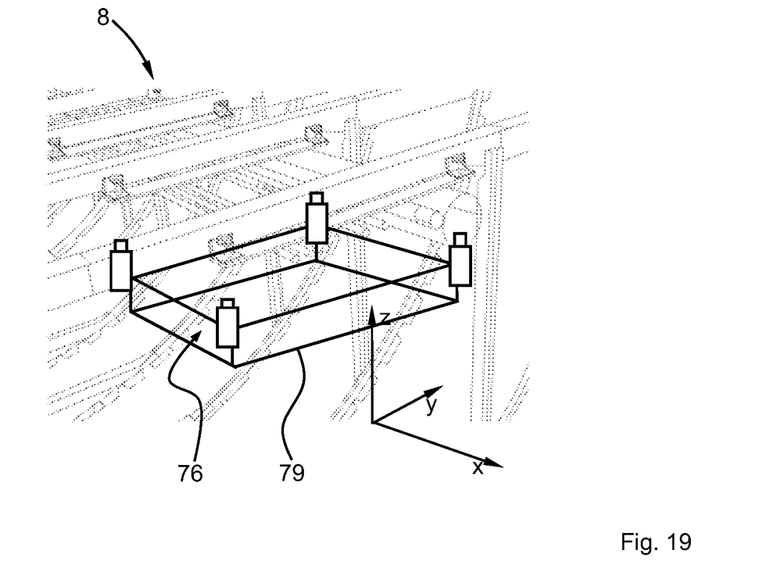

FIG. 19 shows another process step as to how the measurement system 79 is lowered downwards together with the now-empty positioning device 76 preferably parallel to the direction of insertion z and then withdrawn from the fuselage section 8 parallel to the aircraft longitudinal direction x in order in particular to allow free access for further manual finishing work.

Figure 20:
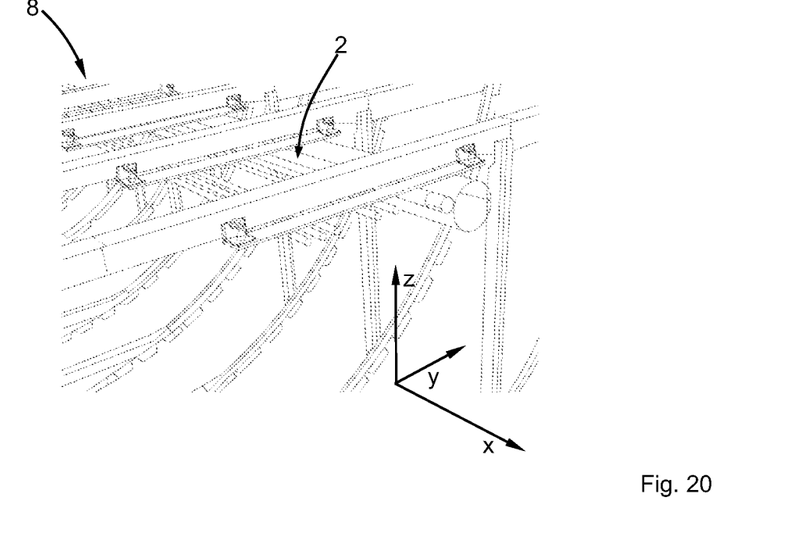

In the next process step according to FIG. 20, the module 2 latched onto the underside of the structure can if necessary be displaced manually by a small amount parallel to the aircraft longitudinal direction x and/or the aircraft transverse direction y and hereby be finely aligned in order, for example, to allow a precise aligned connection to preceding or subsequent modules and their lines or routes. In the last process step the final fixing (positional fixing) of the module on the structure or the cross-beams is accomplished by tightening the nuts to a predetermined torque and inserting the relevant securing pins.

Figure 21:
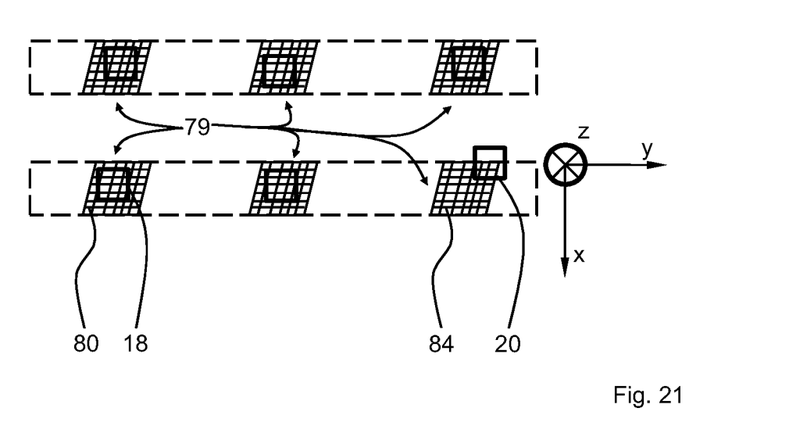
FIG. 21 shows an example of exceeding the tolerance.

FIG. 21 shows schematically a measurement process by means of the measurement system 79 in which an exceeding of tolerances occurs. The view of FIG. 21 corresponds in this case to the view from below in the direction of insertion z, onto the structure or the cross-beams.

The orientation of the mountings 18, 20 in the xy plane on the structure is determined by means of the position scanner of the measurement system 79. As can be seen from FIG. 21, the mounting 18, for example, is located inside the tolerance zone 80 of the relevant position scanner so that the corresponding attachment element can be brought into engagement with the associated receiving plate by using the possibility for compensating for tolerance (of, for example, ±2.5 mm in the xy plane). On the other hand, the mounting 20 is located outside the tolerance zone 84 so that an intermeshing of the corresponding attachment element on the module with the mounting 20 is no longer possible—even using the maximum possible tolerance compensation of the floating receiving element.

In this case, the process is initially interrupted, a corresponding error message is output and the mounting 20 must be moved manually. The error message can, for example, contain the relative and/or the absolute spatial coordinates to which the mounting 20 must be moved. The process is then repeated by renewed measurement by means of the position scanner and optionally the alignment of the positioning device 76 is changed until all the attachment elements of the module can be brought into engagement with the corresponding mountings free from stress and distortion so that the module can be latched with these in the direction of insertion z. As a result of the manual position change of the mountings required in the event of a tolerance being exceeded, this is then merely a partially automatic process.

If necessary, a manual fine alignment of the module in the xy plane can then be made, wherein in any case in a last process step the final anchoring and securing of the module with nuts and securing pins is required.

Disclosed is an installation system 10 for the connection of systems 4 to a structure 6 of an aircraft, in particular, lines or cabin components to a primary structure of an aircraft, with at least one carrier 12 for the arrangement of the systems 4 and with at least two attachment elements 14, 16 for the attachment of the (module) carrier 12 to the structure 6, wherein at least one mounting 18, 20 on the structure is provided with an adjustable reception element 34 for the section-by-section reception of one of the attachment elements 14, 16 as well as a method for the connection of the systems 4.

The method can be used both on a fuselage section which is already closed on the circumference side with the floor framework already integrated and also on a fuselage section in shell design with the lower shell still lacking. Alternatively the method can also be carried out on a free-standing floor framework in an assembly hall or an upper shell, wherein the floor framework or the upper shell is only transferred into the fuselage section after connection of the installation systems or the module or is joined together with the other shell parts. In this context the floor framework or the upper shell should be interpreted as a (part) fuselage section. Furthermore, a universal construction area can be fitted with such a positioning device and with a measurement system in accordance with the invention.

The partially automated connection is effected using a measurement system 79 with a positioning device 76, wherein the positioning device 76 comprises a large number of position scanners 78, in particular in the form of laser position scanners. Whilst being continuously controlled or monitored by the measurement system 79, the module 2 formed with carriers and systems (e.g. lines, routes) of all kinds or prefabricated can be freely aligned in space by means of the positioning device 76 inside the fuselage section 8 of an aircraft and connected to the primary structure, for example, in the form of cross-beams.

REFERENCE LIST

| | | |
|---|---|---|
| 2 | Module | } module |
| 4 | Line | |
| 6 | Cross-beam | |
| 8 | Fuselage section | |
| 10 | Installation system | |
| 12 | Carrier | |
| 14 | Attachment element | } on module |
| 16 | Attachment element | |
| 18 | Mounting | } on structure |
| 20 | Mounting | |
| 22 | Plug | |
| 24 | Base plate | |
| 26 | Latching mechanism | |
| 28 | Nut | |
| 30 | Retention plate | |
| 32 | Guide plate | |
| 34 | Reception element | |
| 36 | Ramp | |
| 38 | Ramp | |
| 40 | Web | |
| 42 | Projection | |
| 44 | Projection | |
| 46 | Cage | |
| 48 | Hole (reception element) | |
| 50 | Plane | |
| 52 | Anchorage device | |
| 54 | Slider | |
| 56 | Guide | |
| 58 | Narrow side | |
| 60 | Edge section | |
| 62 | Anchoring groove | |
| 64 | Finger | |
| 66 | Elongated hole | |
| 68 | Shaft | |
| 70 | Head | |

-continued

| | |
|---|---|
| 72 | Transverse hole |
| 74 | Split pin |
| 76 | Positioning device (transporting device) |
| 78 | Position scanner |
| 79 | Measurement system |
| 80 | Tolerance zone |
| 82 | Central point (hole reception element) |
| 84 | Tolerance zone |
| X | Longitudinal direction of the aircraft |
| Y | Transverse direction of the aircraft |
| Z | Direction of insertion |

What is claimed is:

1. An installation system comprising:
a structure for an aircraft;
at least one carrier for an arrangement of at least one device of the aircraft;
at least two attachment elements configured to attach the at least one carrier to the structure; and
at least one mounting having an adjustable reception element receiving one of the at least two attachment elements, wherein the adjustable reception element is configured to move in a plane transverse to a direction of insertion, wherein the at least one mounting includes a cage attached to the structure, and wherein the adjustable reception element is supported in a floating manner in the cage.

2. The installation system as recited in claim 1, wherein the at least one device includes one of a line and a cabin component, and wherein the structure is a primary structure of the aircraft.

3. The installation system as recited in claim 1, wherein the adjustable reception element receiving one of the at least two attachment elements is configured to adjust automatically.

4. The installation system as recited in claim 1, wherein the at least two attachment elements each include a plug having a half-shell-shaped head for an alignment of the adjustable reception element.

5. The installation system as recited in claim 4, wherein the at least one mounting includes an anchorage device configured to anchor the plug to the adjustable reception element.

6. The installation system as recited in claim 5, wherein the anchorage device includes a pre-loaded slider configured to engage in an anchoring groove of the plug and configured to cover an area of a hole of the adjustable reception element.

7. The installation system as recited in claim 1, wherein the at least one mounting includes a locking clement configured to fix the adjustable reception element.

8. The installation system as recited in claim 7, wherein the locking element is a nut screwable onto an external thread of the plug.

9. The installation system as recited in claim 6, wherein the at least one mounting includes a securing element configured to secure the locking element.

10. The installation system as recited in claim 9, wherein the securing element is a split pin insertable into a transverse hold of the plug.

11. The installation system as recited in claim 1, wherein the at least two attachment elements are displaceable in a longitudinal direction of the carrier.

12. The installation system as recited in claim 11, wherein the carrier includes a latching mechanism disposed on at least one end section of the carrier for insertion of one of the at least two attachment elements.

* * * * *